United States Patent [19]

Hamilton et al.

[11] 3,752,175

[45] Aug. 14, 1973

[54] ALTITUDE COMPENSATING PRESSURE REGULATOR

[75] Inventors: Robert M. Hamilton, Brea; Walter R. Anderson, Yorba Linda, Calif.

[73] Assignee: Robertshaw Control Company, Richmond, Va.

[22] Filed: Aug. 20, 1971

[21] Appl. No.: 173,415

[52] U.S. Cl.................. 137/81, 128/142.2, 137/491, 137/506
[51] Int. Cl.............................................. F16k 17/36
[58] Field of Search.................... 137/81, 63 R, 491, 137/506; 128/142, 142.2

[56] References Cited
UNITED STATES PATENTS
2,988,085 6/1961 Jones................................. 128/142.2
2,596,178 5/1952 Seeler................................. 137/81 X

*Primary Examiner*—Robert G. Nilson
*Assistant Examiner*—Edward Look
*Attorney*—Fulwider, Patton, Rieber, Lee & Utecht

[57] ABSTRACT

An altitude compensating pressure regulator for use with an aircraft breathing device and including a housing formed with a flow passage having inlet and outlet ports and including a control valve responsive to pressure in a control chamber to control flow through such passage. A pilot valve chamber is in communication with such control chamber by means of a passage having flow therethrough controlled by a pilot valve. One wall of the pilot chamber is in the form of a pressure responsive diaphragm which includes a bleed passage and is in engagement on one side with the pilot valve to effect control thereof. A reference chamber is formed on the opposite side of the diaphragm and is formed with an outlet having a reference valve seat formed therein. A reference valve poppet is disposed adjacent the reference valve seat and it is normally biased toward such seat by means of an override spring. Interposed between the override spring and the reference poppet is an aneroid having its exterior exposed to ambient pressure whereby the inlet may be connected with an oxygen supply and the outlet with a pilot's face mask and as the ambient pressure drops with increases in altitude, the aneroid will expand to move the reference poppet toward the reference valve seat to gradually increase the pressure in the reference chamber to adjust the pilot valve for decreasing the pressure in the control chamber to adjust the control valve and progressively increase the flow through the control passage. When a predetermined ambient pressure is reached, the aneroid will be totally relaxed and the pressure in the reference chamber will raise the reference valve poppet against the override spring off the reference valve seat to progressively increase the spacing between such poppet and seat with further decreases in ambient pressure to thereby adjust the control valve to maintain a substantially constant pressure in the control passage.

5 Claims, 3 Drawing Figures

Patented Aug. 14, 1973

3,752,175

INVENTORS.
ROBERT M. HAMILTON
WALTER R. ANDERSON
BY *Fulwider, Patton, Rieber, Lee and Utecht*
ATTORNEYS

ALTITUDE COMPENSATING PRESSURE REGULATOR

BACKGROUND OF THE INVENTION

1. Field of the Invention

The present invention relates generally to pressure regulators and, more particularly, to regulators for controlling the rate of oxygen delivery to a pilot's face mask.

2. Description of the Prior Art

Various pressure regulators have been proposed for controlling the oxygen pressure in a pilot's face mask in response to variations in ambient pressure. However, most of these prior art regulators suffer the shortcoming that the pressure in the face mask varies continuously throughout the entire pressure range to which the regulator is exposed. Such regulators are unacceptable for use in extremely high altitude airplanes since the pressure increase in response to the extremely high altitudes results in an undesirably high pressure in the pilot's face mask. Pressure regulators have been proposed which include separate relief valves which open at a predetermined altitude to limit pressurization of the face mask.

SUMMARY OF THE INVENTION

The altitude compensating pressure regulator of present invention may be used to control flow in a breathing apparatus in an aircraft and is characterized by a control passage having a control valve disposed therein and responsive to pressure fluctuations in a control chamber to control the flow rate past such seat. The control chamber is formed with a pilot valve passage that leads to a reference chamber having a pilot valve disposed therein. One wall of the pressure chamber is in the form of a pressure responsive diaphragm that has a bleed port formed therethrough and engages the pilot valve on one side and has its opposite side exposed to a reference chamber including an outlet passage having a reference valve seat formed therein. A reference poppet is provided for cooperation with the reference seat to control flow from the reference chamber and is biased toward such seat by means of an override spring. Aneroid means is interposed between the override spring and reference poppet for expanding during aircraft climb through lower altitudes to move the reference poppet into closer spaced relationship with the reference seat to progressively increase the pressure in the reference chamber to progressively adjust the pilot valve toward its open position and correspondingly adjust the pressure in the control chamber to effect adjustment of the control valve toward its open position to gradually increase the pressure at the outlet port. Such progressive adjustment will continue until a selected altitude is reached and thereafter the aneroid will be fully expanded to enable the pressure in the reference chamber to overcome the bias of the override spring and reduce the pressure in the reference chamber to cause the pressure responsive member to flex and move the pilot valve toward its closed position thereby increasing the pressure in the control chamber and causing the control valve to be moved toward its closed position thereby adjusting the flow through the control valve to maintain a flow rate that will maintain a substantially constant pressure at the outlet port.

The objects and advantages of the present invention will become apparent from a consideration of the following detailed description when taken in conjunction with the accompanying drawing.

DESCRIPTION OF THE PREFERRED EMBODIMENT

Figure 1:
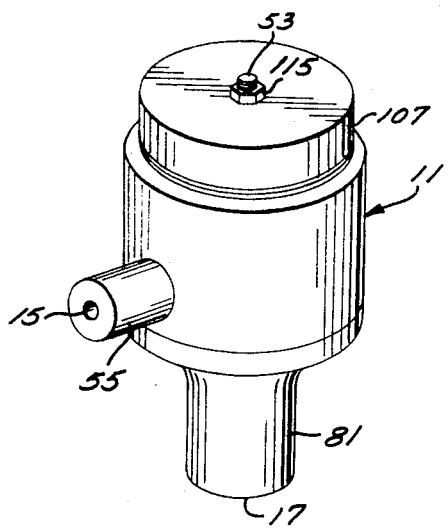
FIG. 1 is a perspective view of an altitude compensating pressure regulator embodying the present invention.
Figure 2:
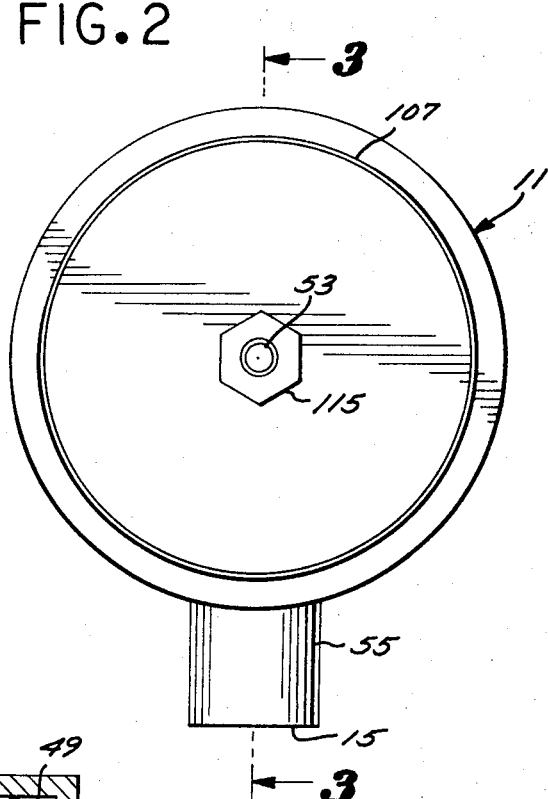
FIG. 2 is a top view, in enlarged scale of the pressure regulator shown in FIG. 1.
Figure 3:
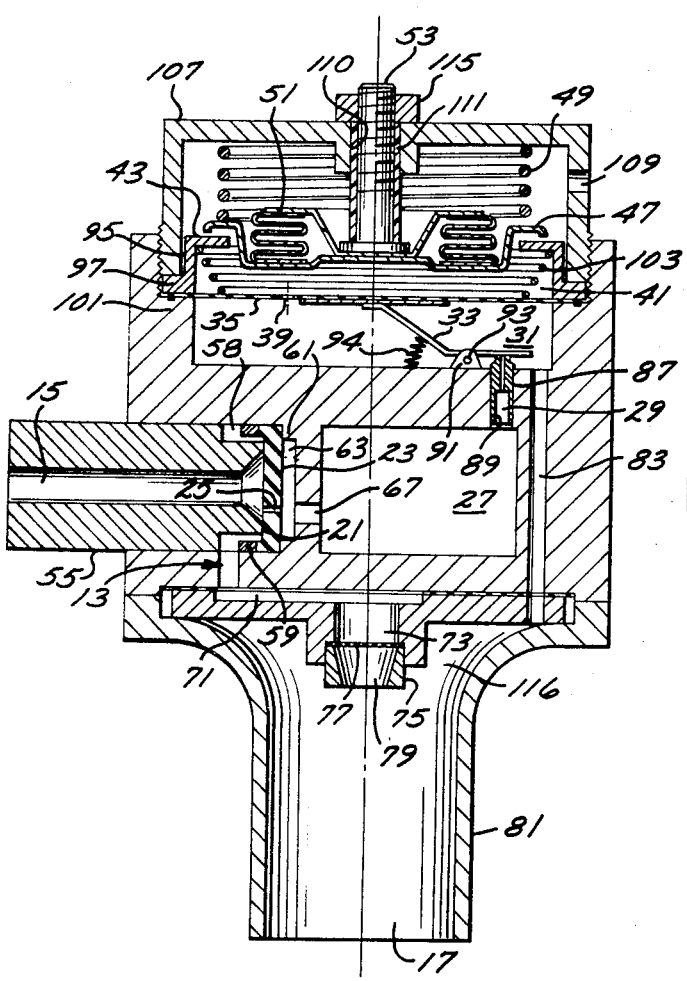
FIG. 3 is a vertical sectional view taken along the line 3—3 of FIG. 2.

The altitude compensating pressure regulator of of present invention may be used to control oxygen flow in an aircraft breathing apparatus and includes, generally, a housing 11 which is formed with a flow control passage 13 having an inlet port 15 and an outlet port 17. Formed in the control passage 13 is a control valve seat 21 which has a control valve poppet in the form of a flexible diaphragm 23 arranged thereover and formed with a bleed port 25. A control chamber 27 is in communication with the side of the control valve poppet 23 opposite the valve seat 21 and includes a pilot valve port 29 leading therefrom and to a pilot valve chamber 31. A pilot valve 33 controls flow through the pilot valve port 29 and has its upper extremity disposed in engagement with the central portion of a flexible diaphragm 35 forming one wall of the pilot valve chamber 31. A reference bleed port 39 is formed in the diaphragm 35 and leads to a reference pressure chamber 41, such chamber being formed at its outlet with an annular flange defining the reference chamber valve seat 43. A reference valve poppet 47 is biased downwardly toward the seat 43 by means of an override spring 49 and downward movement of such poppet 47 is selectively resisted by means of an aneroid assembly 51 carried from a slider stud 53 that is telescopically received in the top wall of the housing 11. Thus, as the aircraft climbs through lower altitudes, the exterior pressure on the aneroid 51 will gradually decrease thereby gradually expanding such aneroid 51 to enable the valve poppet 47 to move downwardly toward the seat 43. When the airplane reaches a predetermined altitude, the aneroid 51 will be expanded sufficiently to bring the reference valve poppet 47 into sufficiently close proximity with the reference valve seat 43 to thereby progressively increase the pressure in the reference chamber 41 and urge the diaphragm 35 progressively downwardly to tend to maintain the pilot valve 33 off the pilot valve port 29 thereby causing the pressure in the control chamber 27 to drop resulting in the control valve poppet 23 being gradually moved into greater spaced relationship with respect to the control valve 21 thereby resulting in the pressure in the outlet port 17 gradually building up with further increase in altitude. When the pressure in the reference chamber 41 becomes sufficient to overcome the bias of the override spring 49 thus lifting to lift the reference valve poppet 47 further off its seat 43 enabling oxygen to escape from the reference chamber 41 at a rate that increases in proportion to the rate of decrease in ambient pressure, the pressure in such reference chamber 41 will gradually decrease to produce a gradually increasing pressure in the control chamber 27 and, consequently, a gradually decreasing flow rate in the flow passage 13 to produce a substantially constant pressure at the outlet port 17 irrespective of further climb.

The inlet port 15 is formed in an inlet nipple 55 which terminates in its inner end in a conically shaped valve port having the control valve seat 21 formed therearound. The inner end of the inlet nipple 55 is formed with a reduced-in-diameter section to form an annular control chamber 58 that leads to the control passage 13. The diaphragm poppet 23 is disposed in confrontation with the seat 21 and has its peripheral portion sandwiched between an annular mounting flange 59 and a confronting shoulder 61 formed in the housing 11. Formed at the front side of the poppet diaphragm 23 is a communication chamber 63 which is of greater diameter than the cross sectional area of the valve port exposed to the opposite side of such diaphragm. The communication chamber 63 is connected with the control chamber 27 by means of a passage 67.

The flow control passage 13 includes a downwardly radially extending bore 71 which leads to an axial bore 73 that is enlarged-in-diameter on its lower extremity for receipt of a nozzle 75 which has a noise reduction screen 77 sandwiched therebehind. The nozzle 75 is formed with a conically shaped flow passage 79 which creates a venturi effect to produce a reduced pressure in the outlet port 17 for compensating purposes that will be made clear hereinafter.

The outlet port 17 is formed in an outlet nipple 81 and is flared outwardly at its upper extremity to communicate with a vertically extending sensing bore 83 leading to the pilot valve chamber 31.

The pilot passage 29 is formed in a tubular insert 87 that is press fit in a vertical bore 89 formed in the housing 11. The pilot valve 33 is in the form of a paddle mounted from a mounting bracket 91 by means of a pivot pin 93 and is urged in a clockwise direction by means of a coil spring 94.

The reference valve seat 43 is formed by an annular fitting 95 which has a radially outwardly projecting retaining flange 97 formed in its lower portion and the peripheral edge of the reference diaphragm 35 is sandwiched between such flange and a shoulder 101 formed in the housing 11. Retained between the seat 43 and the diaphragm 35 is a coil compression spring 103 which biases the central portion of the diaphragm 35 downwardly against the paddle valve 33.

The housing 11 includes a cap 107 in its top end which is formed with a central vertical bore 110 which has a teflon sleeve 111 freely telescoped therein, such sleeve having the mounting stud 53 received therein. The aneroid 51 is connected to the lower end of the stud 53 and a retaining nut 115 is screwed onto the upper end of such stud. The cap 107 includes an ambient pressure sensing port 109 for communicating ambient pressure to the aneroid 51.

In operation, the regulator is mounted in the aircraft to sense ambient pressure, the inlet nipple 55 connected with an oxygen supply tank (not shown), and the outlet boss 81 connected with a conduit leading to the face mask of the pilot (not shown). The oxygen supply valve (not shown) is then opened to admit pressure to the inlet port 15 thereby momentarily raising the control poppet 23 off its seat to permit oxygen to flow into the annular chamber 58 and through the control passage 13 to be emitted from the nozzle outlet 79 and into the outlet port 17 leading to the pilot's face mask. This creates a positive pressure in the face mask and enables the pilot to assure himself that the face mask is well seated on his face as soon as oxygen flow is commenced. At the same time oxygen will flow through the bleed port 25 to the control chamber 27 and will pressurize such chamber to nearly the source pressure thereby applying pressure in the communication chamber 63 which produces sufficient force against the diaphragm type control poppet 23 to overcome the force applied to the opposite side of such diaphragm by the oxygen in the supply port 15 to thereby cause such poppet to be urged to the left against the control port seat 21 to throttle oxygen flow to the outlet port 17.

It will be realized that the pressure in the outlet port 17 will be communicated upwardly through the sensing port 83 to the pilot valve chamber 31 to create sufficient pressure in such pilot valve chamber to overcome the bias of the diaphragm spring 103 coupled with the atmosphere pressure to result in the diaphragm 35 being raised thereby resulting in the pilot valve 33 being rotated clockwise to block further flow through the pilot valve passage 29 to thereby result in pressure build-up in the control chamber 27 and consequent closing of the control valve 23 on the control seat 21.

When the pilot inhales, a pressure reduction will be communicated through the outlet port 17 and sensing port 83 to the pilot valve chamber 31 thereby reducing the pressure therein and enabling the diaphragm spring 103 to move the diaphragm 35 downwardly thereby rotating the pilot valve 33 counterclockwise against the bias of the spring 94 and opening the pilot valve passage 29 to permit oxygen to be exhausted from the control chamber 27 to the pilot chamber 31 thereby dropping the pressure in such control chamber. The pressure drop in such control chamber 27 will result in reduction of pressure in the communication chamber 63 thereby enabling the oxygen in the inlet port 15 to urge the valve poppet 23 off the seat 21 to permit oxygen flow into the annular chamber 58 and through the control passage 13 to the outlet port 17 leading to the pilot's face mask. It should be noted that the screen 77 behind the nozzle 75 reduces the noise resulting from the oxygen flow and creates a slight back pressure to stabilize operation. Also, the venturi effect produced at the outlet of the nozzle 75 reduces the pressure in the sensing chamber 116 of the outlet port 17 to compensate for the pressure drop in the conduit between the outlet port 17 and the face mask.

When the pilot again exhales, the pressure in the outlet port 17 will be increased and such pressure will be communicated through the sensing passage 83 to the pilot chamber 31 thereby pressurizing such pilot chamber and raising the diaphragm 35 to enable the pilot valve 33 and the main valve 23 to again close.

As the airplane continues its climb through the lower elevations, the aneroid 51 will continue to expand in accordance with he progressive reduction of ambient pressure thereby progressively move the reference valve poppet 47 into closer spaced relationship with the reference valve seat 43.

As the airplane reaches a certain altitude a selected pressure will be communicated through the sensing port 109 to the exterior of the aneroid 51 to enable such aneroid to expand sufficiently to engage the reference valve poppet 47 with the reference valve seat 43 to throttle flow past such seat and progressively increase the pressure in the reference chamber 41 to gradually increase the pressure in the pilot valve chamber 31 and reduce the pressure drop through the diaphragm bleed port 39 to thereby result in a reduction in differential pressure across such diaphragm and enabling such diaphragm to gradually move upwardly thereby resulting in the pilot valve 33 being closed. The force-flexure ratio of the aneroid 51 is selected to cause such aneroid to expand at a rate throughout altitudes below 50,000 feet which will move the reference poppet 47 toward the reference seat 43 at a rate which will produce an increase in pressure in the outlet 17 with increases in altitude. The free telescoping of the stud 53 in the low friction teflon sleeve 111 enchances free upward movement of the aneroid 51 after it has been fully relaxed.

Further airplane climb, as to over 50,000 feet, further reduces the ambient pressure thereby decreasing the pressure on the top side of the poppet 47 and enabling the reference pressure which has built up in the reference chamber 41 to overcome the bias of the override spring 49 and lift such poppet 47 off the seat 43 to again create a pressure drop between such poppet and seat and consequently create a pressure drop across the pressure responsive diaphragm 35 thereby causing such diaphragm to move upwardly and resulting in the pilot valve 33 remaining closed for longer periods of time. The force-flexure ratio of the override spring 49 is selected to cooperate with the pressure differential across the poppet 47 resulting from the pressure in the reference chamber 41 and the continuously decreasing ambient pressure during airplane climb to cause such poppet to progressively raise off the seat 43 at a rate which will cause the pressure drop across the opening defined between such poppet and the seat to continue to drop to thereby move the diaphragm 35 progressively upwardly to maintain the pilot valve 33 closed for longer periods of time to enable the pressure in the control chamber 27 to maintain the control poppet in sufficiently close spaced relationship with respect to the control seat 21 to maintain the flow rate through the control passage 13 at a rate which will maintain a substantially constant pressure in the outlet port 17 irrespective of further airplane climb. This will enable the pilot to climb to higher altitudes wihtout the discomfort of being exposed to excessively high face mask oxygen pressures.

From the foregoing, it will be apparent that the pressure regulator of present invention provides a highly effective means for continuously increasing the oxygen pressure in a pilot's face mask throughout airplane climb to a predetermined altitude and then maintaining the face mask pressure at a selected pressure above such predetermined altitude.

Various modifications and changes may be made with regard to the foregoing detailed description without departing from the spirit of the invention.

What is claimed is:

1. A pressure regulator comprising:
 a housing formed with a fluid passage having inlet and delivery ports at the opposite ends thereof, said inlet port being formed with a control valve seat having a predetermined cross sectional flow area;
 a flexible poppet diaphragm mounted in said passage adjacent said control valve seat for selective engagement therewith, said diaphragm including a bleed port;
 control chamber means exposing an area greater than said predetermined area to said diaphragm;
 a pilot valve chamber including port means connecting with said control chamber and having one wall in the form of a pressure responsive pilot diaphragm having an exhaust port therein;
 a sensing passage leading from said outlet port to said pilot valve chamber; and
 valve means in said pilot valve chamber for controlling flow through said port means and including actuating means engaged with said pilot diaphragm and responsive to inward flexure thereof in response to a reduced pressure in said outlet port being communicated to said valve chamber to open said pilot valve to exhaust fluid from said control chamber to thereby reduce the pressure in said control chamber to enable said inlet pressure to lift said poppet diaphragm off said seat to provide for fluid flow from said inlet to said outlet ports.

2. A pressure regulator as set forth in claim 1 for use in an aircraft and that includes:
 a reference chamber formed by said housing and disposed exteriorly of said pilot diaphragm and formed with an outlet defining a reference valve seat;
 a reference poppet disposed adjacent said reference valve seat for exposure on its exterior side to atmospheric pressure;
 biasing means normally urging said reference poppet toward said reference seat; and
 aneroid means interconnected between said housing and said reference valve poppet for selectively resisting travel of said reference poppet toward said reference valve seat and operative in response to a progressive decrease in exterior pressure from atmospheric pressure to a predetermined sub-atmospheric pressure to cooperate with said biasing means to progressively urge said reference poppet toward said reference valve seat to progressively build up the pressure in said reference chamber to flex said pilot diaphragm inwardly and urge said pilot valve toward its open position, said aneroid means being further operative in response to sub-atmospheric pressure below said predetermined sub-atmospheric pressure to free said biasing means from constraint for engagement with said reference poppet free of said aneroid means to cause said biasing means to urge said reference poppet toward said reference valve seat free of the influence of said aneroid means.

3. A pressure regulator as set forth in claim 2 that includes:
 a cap carried from said housing and covering said reference valve seat, said cap being formed with a through opening overlying said aneroid means; and
 slider means received telescopically in said opening and mounting said aneroid means on one end thereof and including stop means on the opposite end thereof for limiting travel of said slider toward said reference valve seat.

4. A pressure regulator as set forth in claim 3 that includes:
 a low friction sleeve telescoped over said slider to facilitate free travel thereof in said opening.

5. A pressure regulator as set forth in claim 1 wherein:
said housing is formed with a bore having an annular shoulder in the bottom thereof;
said poppet diaphragm is in the form of a disc received on said shoulder; and
said inlet port includes tube means telescoped into said bore and terminating in an end forming said control valve seat.

* * * * *